US012560009B2

(12) United States Patent
Tsorng et al.

(10) Patent No.: US 12,560,009 B2
(45) Date of Patent: Feb. 24, 2026

(54) LOCK ASSEMBLY AND COMPUTING SYSTEM INCLUDING THE SAME

(71) Applicant: Quanta Computer Inc., Taoyuan (TW)

(72) Inventors: Yaw-Tzorng Tsorng, Taoyuan (TW); Ming-Lung Wang, Taoyuan (TW); Jia-Lin Liu, Taoyuan (TW); Nan-Chun Wu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 234 days.

(21) Appl. No.: 18/242,173

(22) Filed: Sep. 5, 2023

(65) Prior Publication Data

US 2025/0075543 A1 Mar. 6, 2025

(51) Int. Cl.
*E05C 21/00* (2006.01)

(52) U.S. Cl.
CPC .................................... *E05C 21/00* (2013.01)

(58) Field of Classification Search
CPC .. E05C 21/00; Y10T 292/79; Y10T 292/0982; E05B 9/02; E05B 13/007; E05B 15/00; E05B 63/00; E05B 63/14; E05B 63/143; E05B 65/00; E05B 65/46; H05K 5/02; H05K 5/0221; H05K 7/1488
See application file for complete search history.

(56) References Cited

U.S. PATENT DOCUMENTS 3,993,278 A * 11/1976 Race ................... B60R 11/0205 70/58
4,040,653 A * 8/1977 Takahashi ............... E05B 65/46 292/202
4,455,009 A * 6/1984 Foster .................. B60N 2/0715 248/561

(Continued)

FOREIGN PATENT DOCUMENTS

CN 201629157 U * 11/2010 ........... G11B 33/124
CN 102054514 A * 5/2011 ............. G06F 1/187

(Continued)

OTHER PUBLICATIONS

TW Office Action for Application No. 112143369 mailed Aug. 7, 2024, w/ First Office Action Summary, 4 pp.

(Continued)

*Primary Examiner* — Steven A Tullia
(74) *Attorney, Agent, or Firm* — NIXON PEABODY LLP

(57) ABSTRACT

A computing system includes a computing tray for receiving a computing device; a latch attached to the computing tray for releasing the computing tray during installation or removal operations; and a lock assembly for preventing accidental release of the computing tray. The lock assembly includes a fixed bracket having two fixed sides, one of the fixed sides being a mounting side attached to the computing tray near the latch; and a movable bracket having two movable sides attached respectively to the two fixed sides. The movable bracket is adjustable relative to the fixed (Continued)

bracket between a releasing position and a secured position. The movable bracket allows the latch to release the computing tray in the releasing position, and the movable bracket physically blocks the latch from releasing the computing tray in the secured position.

21 Claims, 11 Drawing Sheets

(56) References Cited

U.S. PATENT DOCUMENTS

| | | | | | |
|---|---|---|---|---|---|
| 4,784,361 | A * | 11/1988 | Kobayashi | B60R 11/0211<br>248/222.13 |
| 6,173,848 | B1 * | 1/2001 | Bravo | H05K 7/1425<br>211/187 |
| 6,749,275 | B2 * | 6/2004 | Cutler | A47B 88/43<br>312/334.4 |
| 6,798,650 | B2 * | 9/2004 | Reznikov | G11B 33/122<br>D14/363 |
| 6,883,884 | B2 * | 4/2005 | Chen | A47B 88/423<br>312/334.44 |
| 6,907,830 | B2 * | 6/2005 | Guinan | E05C 19/001<br>292/341.15 |
| 6,929,339 | B1 * | 8/2005 | Greenwald | A47B 88/43<br>312/334.4 |
| 7,134,802 | B2 * | 11/2006 | Doerr | E05C 19/06<br>403/321 |
| 7,796,396 | B2 * | 9/2010 | Hanson | E05C 1/10<br>292/137 |
| 8,248,775 | B2 * | 8/2012 | Zhang | G11B 33/124<br>361/679.01 |
| 8,864,190 | B2 * | 10/2014 | Chang | H05K 7/1489<br>292/273 |
| 9,022,434 | B2 * | 5/2015 | Crippen | H05K 7/1487<br>292/194 |
| 9,258,913 | B2 * | 2/2016 | Terwilliger | H05K 5/0221 |
| 9,681,574 | B1 * | 6/2017 | Chen | H05K 7/1489 |
| 9,743,767 | B1 * | 8/2017 | Easton | A47B 88/43 |
| 9,795,051 | B2 * | 10/2017 | Huang | H05K 5/0204 |
| 9,915,983 | B2 * | 3/2018 | Yu | G06F 1/187 |
| 10,004,331 | B2 * | 6/2018 | Jeffries | B21C 23/142 |
| 10,136,547 | B1 * | 11/2018 | Cecire | H05K 7/20736 |
| 10,368,460 | B1 * | 7/2019 | Yang | H05K 7/1411 |
| 10,372,175 | B2 * | 8/2019 | Ehlen | H05K 7/1487 |
| 10,667,424 | B2 * | 5/2020 | Lin | H05K 7/1411 |
| 10,765,028 | B1 * | 9/2020 | Beall | H05K 7/1489 |
| 10,912,221 | B2 * | 2/2021 | Yeh | H05K 7/18 |
| 11,337,332 | B1 * | 5/2022 | An | H05K 5/0221 |
| 11,425,838 | B2 * | 8/2022 | Antaran | G06F 1/188 |
| 11,558,974 | B2 * | 1/2023 | Escamilla | H05K 7/1487 |
| 11,613,908 | B2 | 3/2023 | Tower et al. | |
| 11,647,604 | B1 * | 5/2023 | Lin | H05K 7/183<br>211/26 |
| 11,740,667 | B2 * | 8/2023 | Tsorng | H05K 5/0221<br>361/801 |
| 11,864,339 | B2 * | 1/2024 | An | H05K 5/0221 |
| 12,262,500 | B1 * | 3/2025 | An | H05K 7/1489 |
| 2009/0114785 | A1 * | 5/2009 | Huang | A47B 88/43<br>248/220.31 |
| 2015/0351267 | A1 * | 12/2015 | Shah | H05K 7/186<br>312/309 |
| 2021/0368645 | A1 * | 11/2021 | Li | H05K 5/023 |
| 2022/0356890 | A1 * | 11/2022 | Lin | H05K 7/1487 |
| 2024/0389250 | A1 * | 11/2024 | Zhao | H05K 7/1489 |
| 2024/0414867 | A1 * | 12/2024 | Chen | G06F 1/187 |
| 2025/0016946 | A1 * | 1/2025 | Lin | H05K 7/1401 |
| 2025/0040074 | A1 * | 1/2025 | Tsorng | H05K 7/1489 |
| 2025/0056742 | A1 * | 2/2025 | Chang | H05K 5/0221 |

FOREIGN PATENT DOCUMENTS

| | | | | | |
|---|---|---|---|---|---|
| CN | 104503548 | A | | 4/2015 | |
| CN | 205946419 | U | | 2/2017 | |
| CN | 111132494 | A | * | 5/2020 | H05K 7/12 |
| CN | 113323517 | A | | 8/2021 | |
| DE | 3720191 | A | * | 12/1987 | B60R 11/02 |
| DE | 202009007522 | U1 | * | 10/2009 | A47B 88/423 |
| DE | 102020111183 | A1 | * | 11/2020 | G06F 1/181 |
| JP | 4528463 | B2 | * | 8/2010 | H05K 7/14 |
| TW | M425497 | U | * | 3/2012 | H01R 13/627 |
| TW | M531640 | U | * | 11/2016 | G11B 33/02 |
| TW | I600392 | B | * | 10/2017 | H05K 7/1489 |
| TW | I639377 | B | | 10/2018 | |
| TW | I747393 | B | * | 11/2021 | H05K 5/0221 |
| WO | WO-2004000078 | A1 | * | 12/2003 | A47B 88/044 |

OTHER PUBLICATIONS

TW Search Report for Application No. 112143369 mailed Aug. 7, 2024, w/ First Office Action, 1 p.

* cited by examiner

LOCK ASSEMBLY AND COMPUTING SYSTEM INCLUDING THE SAME

FIELD OF THE INVENTION

The present invention relates generally to a lock assembly for a computing system and a computing system comprising a lock assembly, and more specifically, to a lock assembly configured to change between a releasing position and a secured position, to allow or block releasing of a computing tray by a latch.

BACKGROUND OF THE INVENTION

In computing systems, a latch is used to control installation and removal of a computing tray for receiving a computing device. For example, see the latch 100 attached to the computing tray 110 as shown in FIG. 1. In general, such a latch 100 can be easily manipulated by simply touching the latch to release the computing tray 110 from the prior art computing system. Thus, it is possible that a user or technician may accidentally touch the latch 100, causing the computing tray 110 to be released unintentionally. Sometimes, such unintentional release of the computing tray 110 may disrupt the computing system.

Therefore, a need exists for solving the problem of accidentally releasing the computing tray due to unintentional contact with the latch. A need also exists for providing an easy and convenient locking mechanism to prevent accidental touching of the latch causing release of the computing tray.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In view of the above-described problem with the conventional way of manipulating a latch to release a computing tray from a computing system that is prone to accidentally releasing the computing tray, a lock assembly is provided to prevent unintentional releasing of the computing tray caused by accidental touching of the latch. By employing a lock assembly, manipulation of the latch can be controlled such that no accidental release of the computing tray can occur. In particular, by placing the lock assembly in a secured position, the latch is prevented from being activated even when the latch is touched accidentally. In order to allow activation of the latch, the lock assembly must be placed in a releasing position by manipulating the lock assembly. Therefore, use of the lock assembly with the latch can prevent accidental release of the computing tray from the computing system. Although the computing system is exemplified as a system having a latch throughout the specification, the lock assembly can be used with any type of communication system or computing device.

According to certain aspects of the present disclosure, a computing system is disclosed. According to various embodiments, the computing system includes a computing tray for receiving a computing device; a latch attached to the computing tray for releasing the computing tray during installation or removal operations; and a lock assembly for preventing accidental release of the computing tray. The lock assembly includes a fixed bracket having two fixed sides, one of the fixed sides being a mounting side attached to the computing tray near the latch; and a movable bracket having two movable sides attached respectively to the two fixed sides. The movable bracket is adjustable relative to the fixed bracket between a releasing position and a secured position. The movable bracket allows the latch to release the computing tray in the releasing position, and the movable bracket physically blocks the latch from releasing the computing tray in the secured position.

In various embodiments, the two fixed sides are parallel and connected by a first side of the fixed bracket. In various embodiments, the two movable sides are parallel and connected by a first side of the movable bracket. In various embodiments, the first side of the fixed bracket is parallel to the first side of the movable bracket, and the two fixed sides are parallel to the two movable sides when the movable bracket is slidably engaged with the fixed bracket.

In various embodiments, another one of the fixed sides includes a first through hole configured to receive a first fastener. In various embodiments, one of the movable sides includes a second through hole and a third through hole, each of the second through hole and the third through hole being configured to receive the first fastener passing through the first through hole.

In various embodiments, the lock assembly is maintained in the releasing position by the first fastener passing through the first through hole and the second through hole. In various embodiments, the lock assembly is maintained in the secured position by the first fastener passing through the first through hole and the third through hole.

In various embodiments, a pin protrudes from the one of the fixed sides. In various embodiments, the one of the fixed sides includes at least one through hole configured to receive a second fastener such that the fixed bracket is attached to the computing tray by the second fastener penetrating the at least one through hole and the computing tray. In various embodiments, the at least one through hole includes a fourth through hole and a fifth through hole, each of the fourth through hole and the fifth through hole being configured to receive a respectively corresponding second fastener.

In various embodiments, the pin is inserted into a hole at the one of the fixed sides between the fourth through hole and the fifth through hole.

In various embodiments, each of the fourth through hole and the fifth through hole protrudes such that the movable bracket is movable with respect to the fixed bracket only between the fourth through hole and the fifth through hole.

In various embodiments, a groove is at another one of the movable sides, the groove being configured to engage or disengage with the pin. In various embodiments, the groove is not engaged with the pin when the lock assembly is in the releasing position. In various embodiments, the groove is engaged with the pin when the lock assembly is in the secured position.

In various embodiments, the latch is movable towards a space below the movable bracket when the lock assembly is in the releasing position. In various embodiments, the latch is not movable towards the space due to the movable bracket blocking the latch when the lock assembly is in the secured position.

In various embodiments, a height the one of the fixed sides is greater than a height of a corresponding one of the movable sides. In various embodiments, a height of another one of the fixed sides is same or substantially same as a height of a corresponding another one of the movable sides.

In various embodiments, a surface area of the fixed bracket is greater than a surface area of the movable bracket.

According to other aspects of the present disclosure, a method for releasing a computing tray from a computing system is disclosed. According to various embodiments, the method includes manipulating a lock assembly in a secured position to place the lock assembly in a releasing position, wherein a latch attached to the computing tray for releasing the computing tray is blocked from releasing the computing tray in the secured position; manipulating the latch to release the computing tray in the releasing position, wherein the latch is allowed to release the computing tray in the releasing position; and releasing the computing tray from the computing system.

In various embodiments, the lock assembly includes a fixed bracket having two fixed sides, one of the fixed sides being a mounting side attached to the computing tray near the latch; and a movable bracket having two movable sides attached respectively to the two fixed sides, the movable bracket being adjustable relative to the fixed bracket between the releasing position and the secured position. In various embodiments, the movable bracket allows the latch to release the computing tray in the releasing position, the movable bracket physically blocking the latch from releasing the computing tray in the secured position.

In various embodiments, the lock assembly is maintained in the releasing position by a fastener passing through a first through hole at another one of the fixed sides and a second through hole at one of the movable sides. In various embodiments, the lock assembly is maintained in the secured position by the fastener passing through the first through hole and a third through hole at the one of the movable sides. In various embodiments, the manipulating the lock assembly comprises disengaging the fastener from the first through hole and the third through hole and/or engaging the fastener with the first through hole and the second through hole.

In various embodiments, a hole is at the one of the fixed sides; a pin is inserted into the hole such that the pin protrudes from the one of the fixed sides; a groove is at another one of the movable sides, the groove being configured to engage or disengage with the pin; and the groove is not engaged with the pin when the lock assembly is in the releasing position; the groove is engaged with the pin when the lock assembly is in the secured position. In various embodiments, the manipulating the lock assembly further comprises disengaging the groove from the pin.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figure 1:
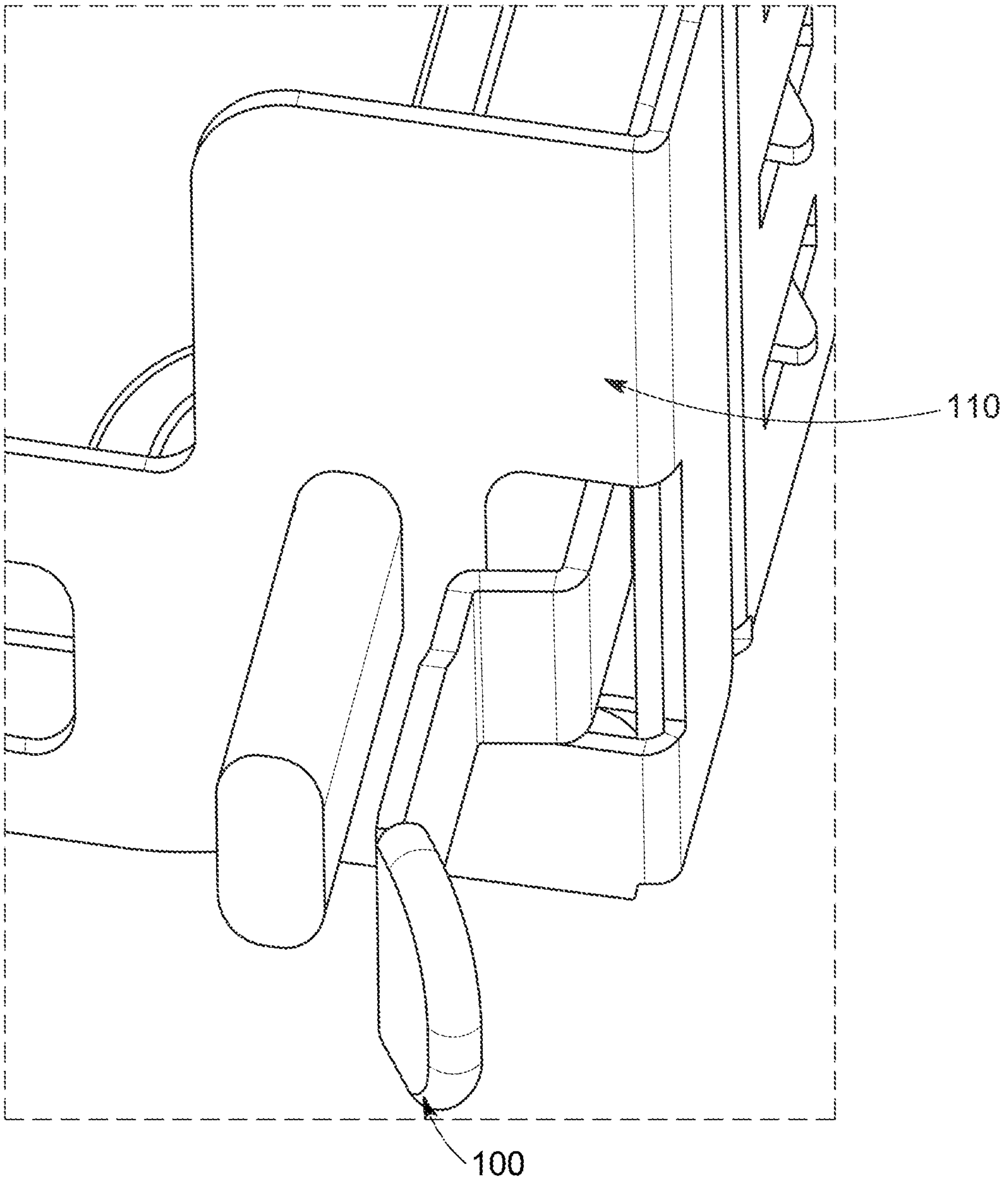
FIG.1 (Prior Art)
FIG. 1 is an example of a latch used for release of a computing tray from a prior art computing system.

Elements in the figures are illustrated for simplicity and clarity and have not necessarily been drawn to scale. For example, the dimensions and/or relative positioning of some of the elements in the figures may be exaggerated relative to other elements to help improve understanding of various features.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word “including” means “including without limitation.” Moreover, words of approximation, such as “about,” “almost,” “substantially,” “approximately,” and the like, can be used herein to mean “at,” “near,” “nearly at,” “within 3-5% of,” “within acceptable manufacturing tolerances of,” or any logical combination thereof. Similarly, terms “vertical” or “horizontal” are intended to additionally include “within 3-5% of” a vertical or horizontal orientation, respectively. Additionally, words of direction, such as “top,” “bottom,” “left,” “right,” “above,” and “below” are intended to relate to the equivalent direction as depicted in a reference illustration; as understood contextually from the object(s) or element(s) being referenced, such as from a commonly used position for the object(s) or element(s); or as otherwise described herein.

Figure 2A:
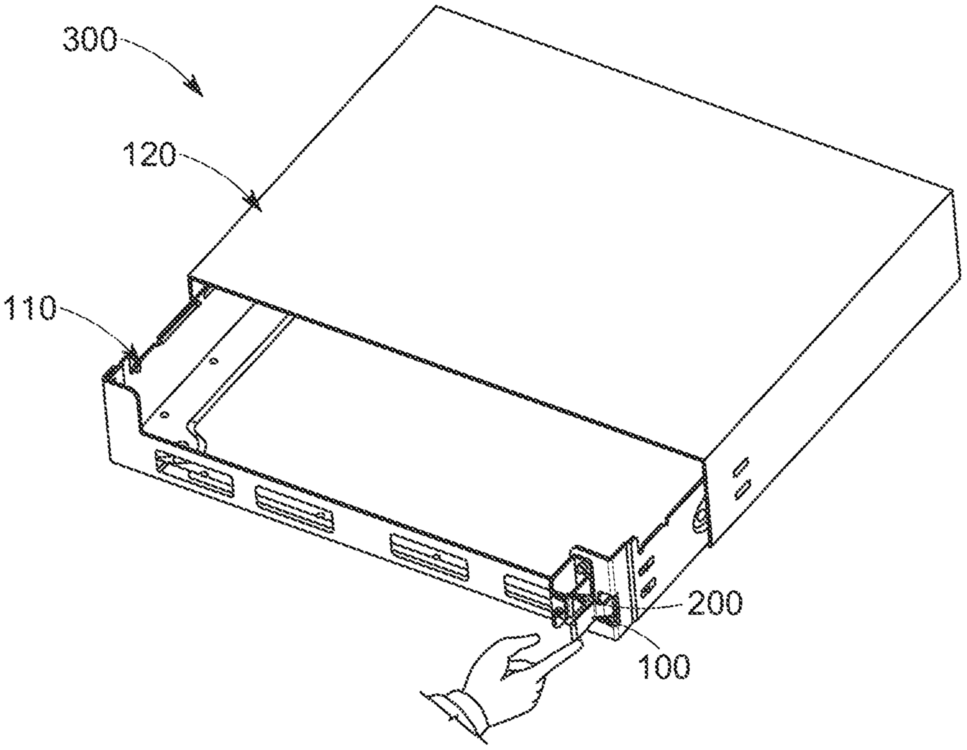
FIGS. 2A and 2B show a latch and a lock assembly of a computing system, according to certain aspects of the present disclosure.
Figure 2B:
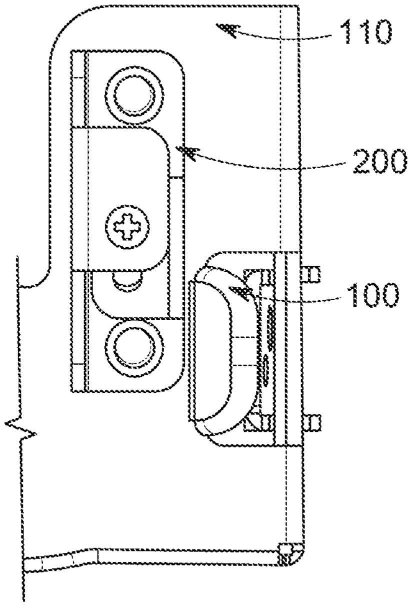

A computing system 300 including a latch 100, a computing tray 110, a case 120, and a lock assembly 200, according to various embodiments of the present invention, is shown in FIGS. 2A and 2B. Referring to FIGS. 2A and 2B, in various embodiments, the lock assembly 200 is attached to the computing tray 110 near the latch 100. In some embodiments, the computing tray 110 can be pulled out of the case 120 by manipulating the latch 100. For example, referring to FIG. 2A, a pressure can be applied to the latch 100 with a finger such that the latch 100 moves in response to the pressure, thus allowing release of the computing tray 110. In this case, the lock assembly 200 is in a releasing position such that the latch 100 responds in response to the pressure. In FIG. 2B, the lock assembly 200 is set to a secured position, and therefore, the latch 100 is blocked by the lock assembly. Thus, even if a pressure is applied to the latch 100 with the finger while the lock assembly 200 is in the secured position, the lock assembly 200 physically blocks the latch 100 from releasing the computing tray 110.

Figure 3A:
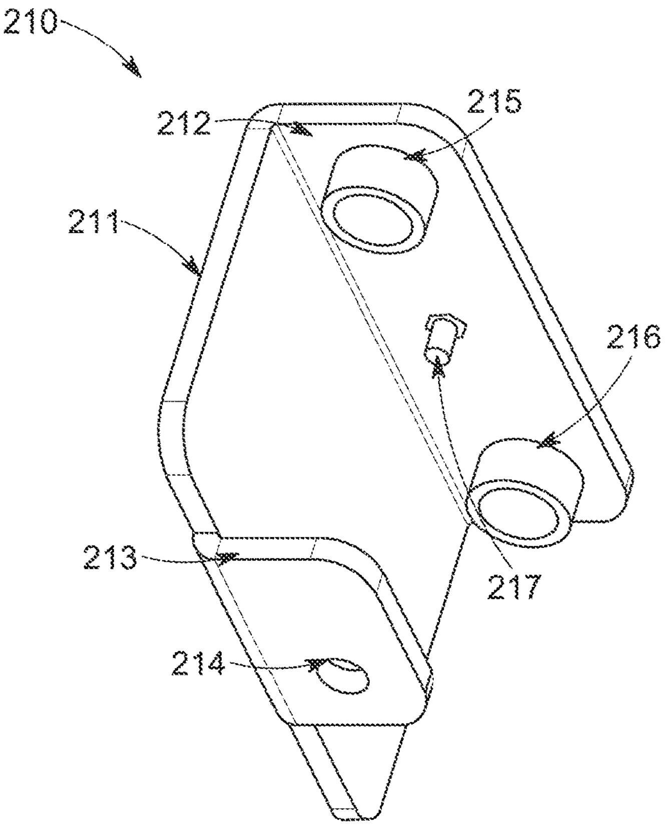
FIGS. 3A, 3B, and 3C show a fixed bracket of a lock assembly in various views, according to certain aspects of the present disclosure.
Figure 3B:
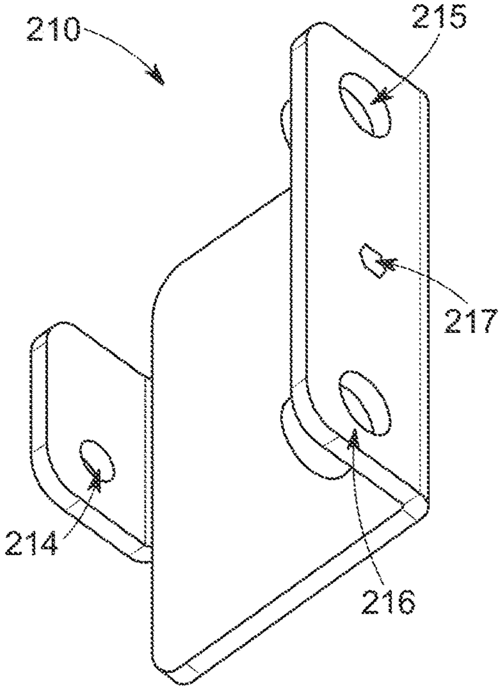
Figure 3C:
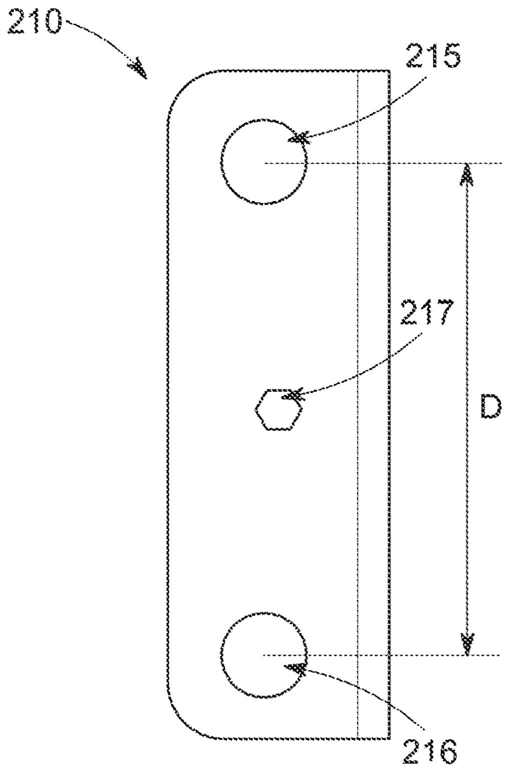

Referring to FIGS. 3A-3C, in various embodiments, the lock assembly 200 includes a fixed bracket 210. In some embodiments, the fixed bracket 210 is made of metal such as iron. As shown in FIGS. 3A and 3B, the fixed bracket 210 has two fixed sides 212, 213 that are parallel. The two fixed sides 212, 213 are connected by a first side 211. In various embodiments, sizes of the two fixed sides 212, 213 are different. In various embodiments, the size of the fixed side 212 is greater than the size of the fixed side 213. In various embodiments, the height of the fixed side 212 is greater than the height of the fixed side 213. However, in some embodiments, the sizes and/or heights of the two fixed sides 212, 213 may be substantially the same or similar.

Referring to FIGS. 3A and 3B, in various embodiments, the fixed side 213 includes a first through hole 214. In some embodiments, the fixed side 212 includes at least one through hole 215 and/or 216. In some embodiments, the fixed side 212 includes a pair of through holes 215, 216. In some embodiments, the at least one through hole 215 and/or 216 protrudes at one side of the fixed side 212, as exemplified in FIGS. 3A and 3B. Each of the first through hole 214 and through holes 215, 216 is configured to receive a fastener 230, 240, and 250, respectively. In some embodiments, the fixed side 212 further includes a pin 217 protruding from the fixed side 212. In some embodiments, the pin 217 is inserted into a hole at the fixed side 212. In some embodiments, the hole configured to receive the pin 217 is between the through holes 215, 216. In some embodiments, the pin 217 is made of metal or plastic material.

Figure 4A:
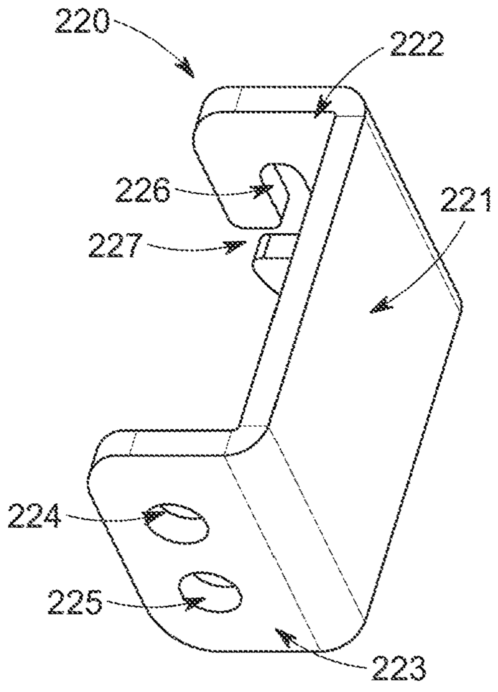
FIGS. 4A, 4B, and 4C show a movable bracket of a lock assembly in various views, according to certain aspects of the present disclosure.
Figure 4B:
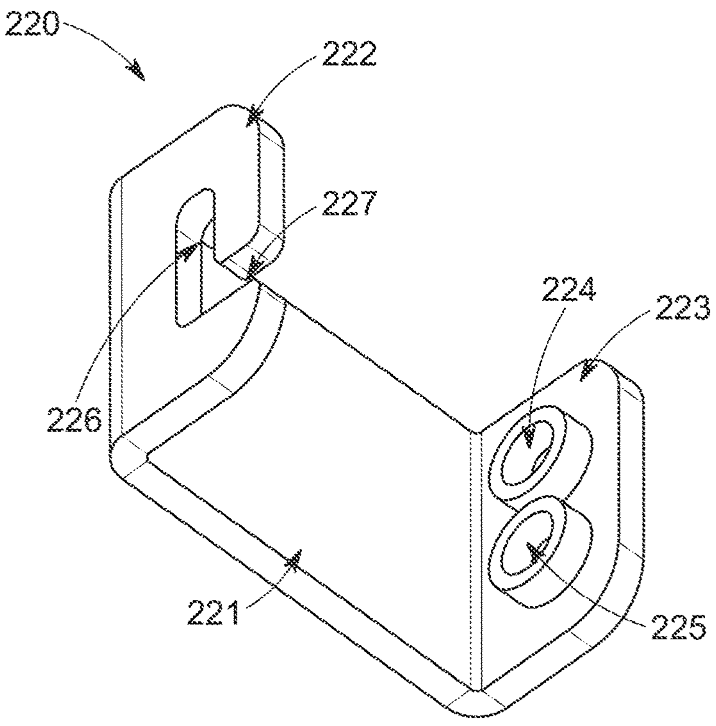
Figure 4C:
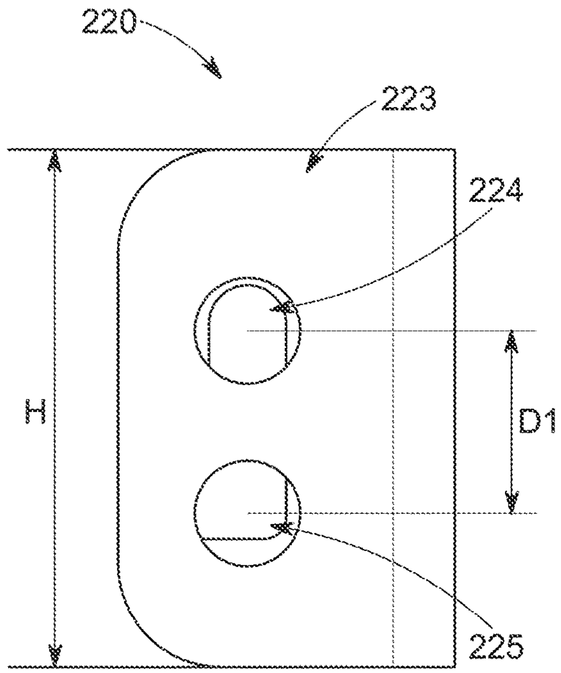

As shown in FIGS. 4A-4C, in various embodiments, the lock assembly 200 further includes a movable bracket 220. In some embodiments, the movable bracket 220 is made of metal such as iron. As shown in FIGS. 4A and 4B, the movable bracket 220 has two movable sides 222, 223 that are parallel. The two movable sides 222, 223 are connected by a first side 221. In various embodiments, shapes of the two movable sides 222, 223 are different. In various embodiments, the height of the movable side 222 and the height of the movable side 223 are same or substantially same. However, in some embodiments, the heights of the two movable sides 222, 223 may be different.

Referring to FIGS. 4A-4C, in various embodiments, the movable side 223 includes a pair of through holes 224, 225. In some embodiments, the pair of through holes 224, 225 is arranged vertically. In some embodiments, the pair of through holes 224, 225 protrudes at one side of the movable side 223, as exemplified in FIG. 4B. Each of the pair of through holes 224, 225 is configured to receive a fastener 230. In some embodiments, the movable side 222 includes a groove 226. For example, the groove 226 extends from an opening 227 at the movable side 222. In some embodiments, the groove 226 is elongated in a vertical direction. In some embodiments, the groove 226 is perpendicular to the opening 227 at the movable side 222.

Referring to FIGS. 3C and 4C, the distance (D) between the through holes 215, 216 is greater than the height (H) of the movable bracket 220. Further, the distance (D) between the through holes 215, 216 is greater than the distance (D1) between the through holes 224, 225. In some embodiments, the distance (D1) determines a moving distance of the movable bracket 220 with respect to the fixed bracket 210.

Figure 5A:
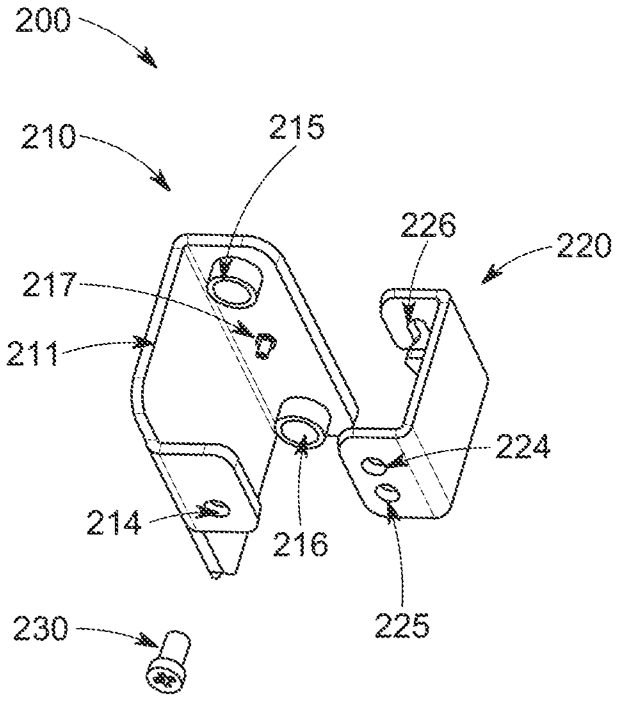
FIGS. 5A, 5B, and 5C depict engaging a fixed bracket with a movable bracket to form a lock assembly, according to certain aspects of the present disclosure.
Figure 5B:
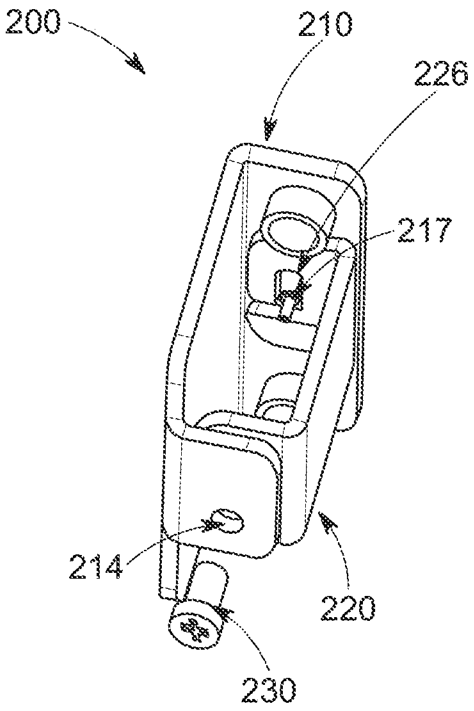
Figure 5C:
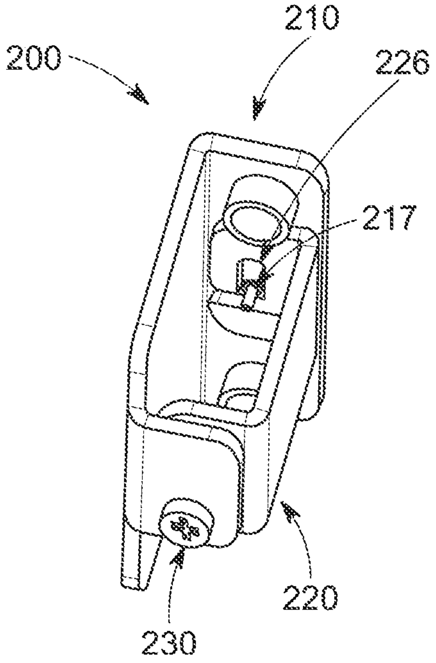

Referring to FIGS. 5A, 5B, and 5C, in various embodiments, a lock assembly 200 for preventing accidental release of the computing tray 110 includes a fixed bracket 210 having two fixed sides 212, 213. One of the fixed sides 212, 213 is a mounting side attached to the computing tray 110 near the latch 100. The lock assembly 200 further includes a movable bracket 220 having two movable sides 222, 223 attached respectively to the two fixed sides 212, 213. The movable bracket 220 is adjustable relative to the fixed bracket 210 between a releasing position (shown in FIGS. 8A and 8B) and a secured position (shown in FIGS. 9A and 9B).

Referring to FIG. 5A, in order to attach the movable bracket 220 to the fixed bracket 210, the pin 217 is inserted into the opening 227 such that the pin 217 is eventually placed right under the groove 226, as shown in FIG. 5B. In this case, the through hole 225 is aligned with the first through hole 214, as shown in FIG. 5B. When the through hole 225 is aligned with the first through hole 214, the fastener 230 is inserted into the first through hole 214 and the through hole 225, as shown in FIG. 5C, such that the lock assembly 200 is maintained in the releasing position. When the lock assembly 200 is maintained in the releasing position, the pin 217 is not engaged with the groove 226, as shown in FIG. 5C.

Figure 6A:
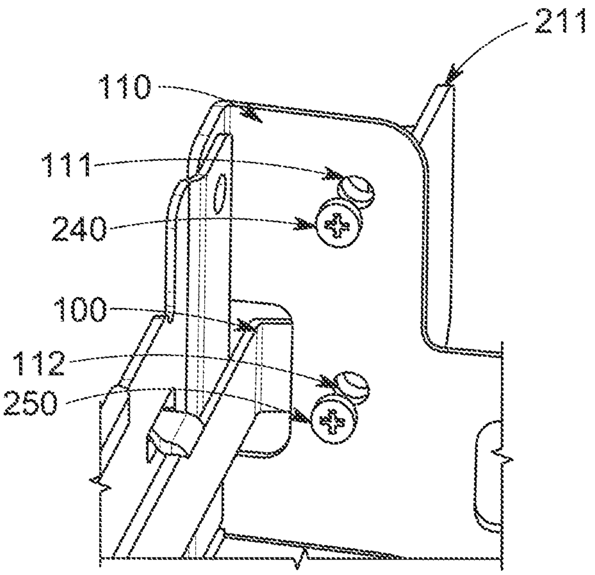
FIG. 6A shows a portion of a computing tray with a latch attached thereto, according to certain aspects of the present disclosure.

FIG. 6A is an internal view of a portion of the computing tray 110 with the latch 100, the fixed bracket 210 attached externally to the computing tray 110. Referring to FIG. 6A, the fixed bracket 210 is attached to the external surface of the computing tray 110 by aligning the through holes 215, 216 with the through holes 111, 112, respectively, at the computing tray 110. When the through holes 215, 216 are aligned with the through holes 111, 112, fasteners 240, 250 are inserted thereto, as shown in FIG. 6A.

Figure 6B:
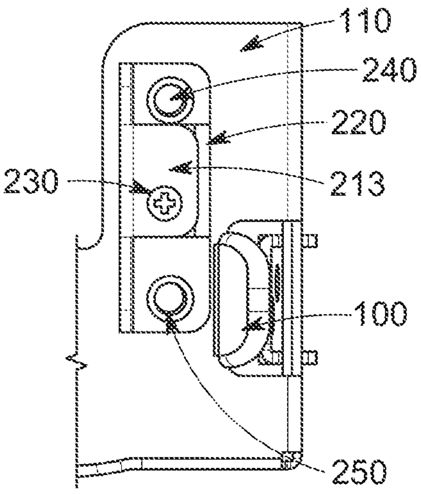
FIG. 6B shows a rear view of the portion of the computing tray shown in FIG. 6A, according to certain aspects of the present disclosure.

FIG. 6B is an external view of the portion of the computing tray 110 shown in FIG. 6A. Referring to FIG. 6B, the lock assembly 200 is attached to the external surface of the computing tray 110 near the latch 100. As shown in FIG. 6B, the fixed side 212 is a mounting side attached to the computing tray 110. The fasteners 240, 250 inserted to the through holes 111, 112 and the through holes 215, 216 are exposed, as shown in FIG. 6B. Further, referring to FIG. 6B, the movable bracket 220 is attached to the fixed bracket 210 and the fastener 230 is inserted into the first through hole 214 and the through hole 225, as also shown in FIG. 5C. Thus, in FIG. 6B, the lock assembly 200 is in the releasing position, and the latch 100 is not blocked by the movable bracket 220.

Figure 7A:
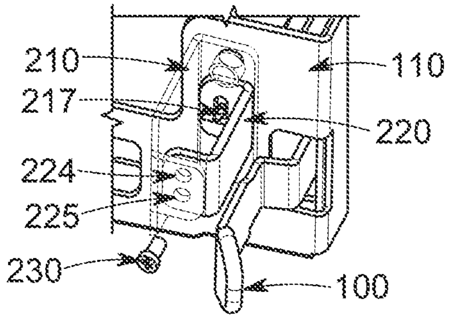
FIGS. 7A, 7B, and 7C depict adjusting a movable bracket of a lock assembly relative to a fixed bracket from a releasing position to a secured position, according to certain aspects of the present disclosure.
Figure 7B:
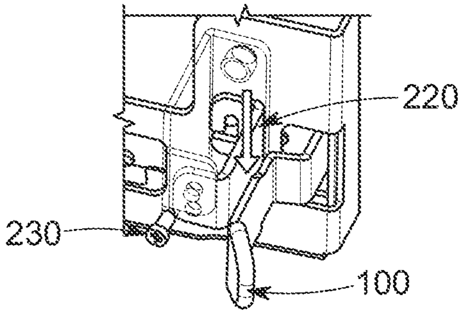
Figure 7C:
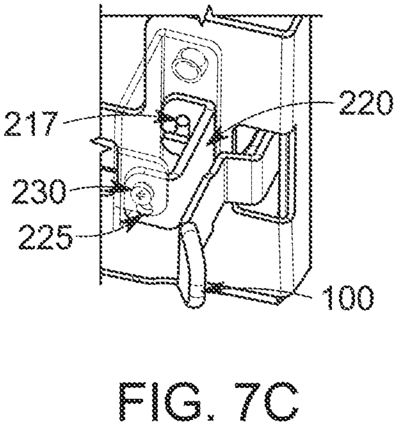

FIGS. 7A, 7B, and 7C describe adjusting the lock assembly 200 such that its position is changed from the releasing position to the secured position. Referring to FIG. 7A, first, the fastener 230 is removed from the first through hole 214 and the through hole 225 while the lock assembly 200 is in the releasing position. Referring to FIG. 7B, once the fastener 230 is removed, the movable bracket 220 is moved downward with respect to the fixed bracket 210 to engage the pin 217 with the groove 226. Referring to FIG. 7C, when the pin 217 is fully engaged with the groove 226, the fastener 230 is inserted into the first through hole 214 and the through hole 224 to maintain the lock assembly 200 in the secured position. As shown in FIG. 7C, when the lock assembly 200 is in the secured position, the movable bracket 220 physically blocks the latch 100 from releasing the computing tray 110.

Figure 8A:
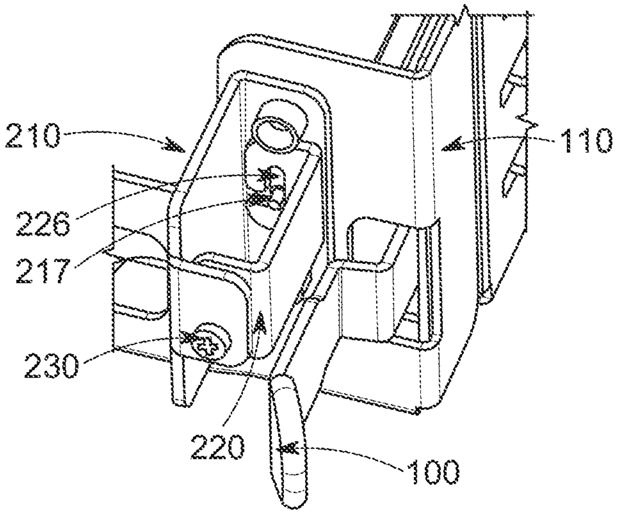
FIGS. 8A and 8B show a lock assembly in a releasing position, according to certain aspects of the present disclosure.
Figure 8B:
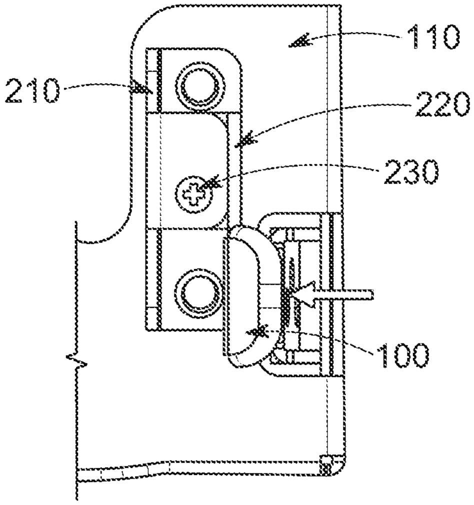
Figure 9A:
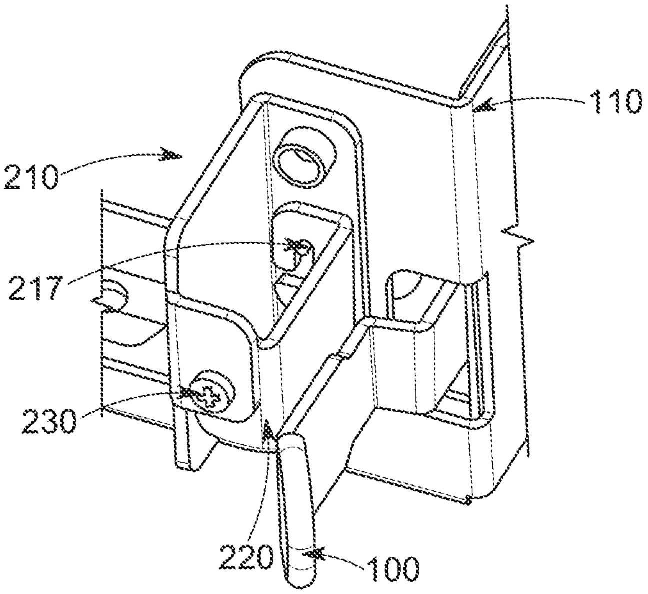
FIGS. 9A and 9B show a lock assembly in a secured position, according to certain aspects of the present disclosure.
Figure 9B:
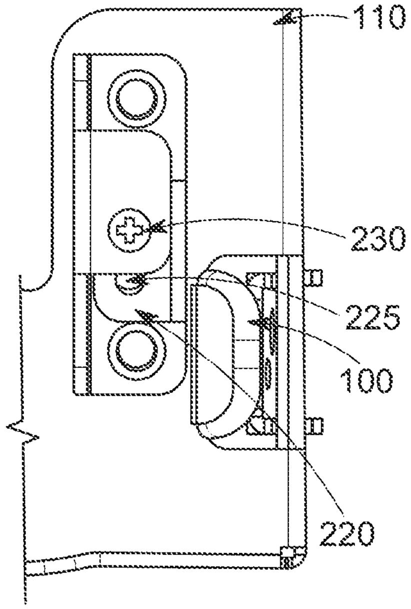

Referring to FIGS. 8A and 8B, the movable bracket 220 allows the latch 100 to release the computing tray 110 in the releasing position. Further, referring to FIGS. 9A and 9B, the movable bracket 220 physically blocks the latch 100 from releasing the computing tray 110 in the secured position. Therefore, in order to release the computing tray 110 using the latch 100, the lock assembly 200 should be placed in the releasing position first. The lock assembly 200 disclosed herein clearly provides a mechanism for preventing accidental, unintentional release of the computing tray 110 even when the latch 100 is touched.

In various embodiments, a method for releasing a computing tray 110 from a computing system 300 includes manipulating a lock assembly 200 in a secured position to place the lock assembly 200 in a releasing position. A latch 100 attached to the computing tray 110 for releasing the computing tray is blocked from releasing the computing tray in the secured position. When the lock assembly 200 is in the releasing position, the latch 100 is manipulated to release the computing tray 110 in the releasing position. The latch 100 is allowed to release the computing tray 110 in the releasing position. In some embodiments, the manipulating the lock assembly 200 includes disengaging the fastener 230 from the first through hole 214 and the through hole 224 and/or engaging the fastener 230 with the first through hole 214 and the through hole 225 to place the lock assembly 200 in the releasing position. In some embodiments, the manipulating the lock assembly 200 further includes disengaging the groove 226 from the pin 217.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computing system comprising:
- a computing tray;
- a latch attached to the computing tray; and
- a lock assembly including
  - a fixed bracket having two fixed sides, one of the fixed sides being a mounting side attached to the computing tray near the latch; and
  - a movable bracket having two movable sides attached respectively to the two fixed sides, the movable bracket being adjustable relative to the fixed bracket between a releasing position and a secured position, the movable bracket allowing the latch to release the computing tray in the releasing position, the movable bracket physically blocking the latch from releasing the computing tray in the secured position;
- wherein another one of the fixed sides includes a first through hole configured to receive a first fastener; and
- wherein one of the movable sides includes a second through hole and a third through hole, each of the second through hole and the third through hole being configured to receive the first fastener passing through the first through hole.

2. The computing system of claim 1, wherein:

the two fixed sides are parallel and connected by a first side of the fixed bracket;

the two movable sides are parallel and connected by a first side of the movable bracket; and the first side of the fixed bracket is parallel to the first side of the movable bracket, and the two fixed sides are parallel to the two movable sides when the movable bracket is slidably engaged with the fixed bracket.

3. The computing system of claim 1, wherein:

the lock assembly is maintained in the releasing position by the first fastener passing through the first through hole and the second through hole; and the lock assembly is maintained in the secured position by the first fastener passing through the first through hole and the third through hole.

4. The computing system of claim 1, wherein a pin protrudes from the one of the fixed sides.

5. The computing system of claim 4, wherein the one of the fixed sides includes at least one through hole configured to receive a second fastener such that the fixed bracket is attached to the computing tray by the second fastener penetrating the at least one through hole and the computing tray.

6. The computing system of claim 5, wherein the at least one through hole includes a fourth through hole and a fifth through hole, each of the fourth through hole and the fifth through hole being configured to receive a respectively corresponding second fastener.

7. The computing system of claim 6, wherein the pin is inserted into a hole at the one of the fixed sides between the fourth through hole and the fifth through hole.

8. The computing system of claim 6, wherein each of the fourth through hole and the fifth through hole protrudes such that the movable bracket is movable with respect to the fixed bracket only between the fourth through hole and the fifth through hole.

9. The computing system of claim 6, wherein the pin is inserted into a hole at the one of the fixed sides between the fourth through hole and the fifth through hole.

10. The computing system of claim 6, wherein each of the fourth through hole and the fifth through hole protrudes such that the movable bracket is movable with respect to the fixed bracket only between the fourth through hole and the fifth through hole.

11. The computing system of claim 5, wherein the at least one through hole includes a fourth through hole and a fifth through hole, each of the fourth through hole and the fifth through hole being configured to receive a respectively corresponding second fastener.

12. The computing system of claim 4, wherein a groove is at another one of the movable sides, the groove being configured to engage or disengage with the pin.

13. The computing system of claim 12, wherein:

the groove is not engaged with the pin when the lock assembly is in the releasing position; and the groove is engaged with the pin when the lock assembly is in the secured position.

14. The computing system of claim 1, wherein:

the latch is movable towards a space below the movable bracket when the lock assembly is in the releasing position; and the latch is not movable towards the space due to the movable bracket blocking the latch when the lock assembly is in the secured position.

15. The computing system of claim 1, wherein a height the one of the fixed sides is greater than a height of a corresponding one of the movable sides.

16. The computing system of claim 15, wherein a height of another one of the fixed sides is same or substantially same as a height of a corresponding another one of the movable sides.

17. The computing system of claim 1, wherein a surface area of the fixed bracket is greater than a surface area of the movable bracket.

18. A method for releasing a computing tray from a computing system, the method comprising:

manipulating a lock assembly in a secured position to place the lock assembly in a releasing position, wherein a latch attached to the computing tray for releasing the computing tray is blocked from releasing the computing tray in the secured position;

manipulating the latch to release the computing tray in the releasing position, wherein the latch is allowed to release the computing tray in the releasing position; and releasing the computing tray from the computing system;

wherein the lock assembly includes:

a fixed bracket having two fixed sides, one of the fixed sides being a mounting side attached to the computing tray near the latch; and a movable bracket having two movable sides attached respectively to the two fixed sides, the movable bracket being adjustable relative to the fixed bracket between the releasing position and the secured position, the movable bracket allowing the latch to release the computing tray in the releasing position, the movable bracket physically blocking the latch from releasing the computing tray in the secured position; and wherein:

the lock assembly is maintained in the releasing position by a fastener passing through a first through hole at another one of the fixed sides and a second through hole at one of the movable sides;

the lock assembly is maintained in the secured position by the fastener passing through the first through hole and a third through hole at the one of the movable sides; and the manipulating the lock assembly comprises disengaging the fastener from the first through hole and the third through hole and/or engaging the fastener with the first through hole and the second through hole.

19. The method of claim 18, wherein:

a hole is at the one of the fixed sides;

a pin is inserted into the hole such that the pin protrudes from the one of the fixed sides;

a groove is at another one of the movable sides, the groove being configured to engage or disengage with the pin;

the groove is not engaged with the pin when the lock assembly is in the releasing position;

the groove is engaged with the pin when the lock assembly is in the secured position; and the manipulating the lock assembly further comprises disengaging the groove from the pin.

20. A computing system comprising:

a computing tray;

a latch attached to the computing tray; and a lock assembly including a fixed bracket having two fixed sides, one of the fixed sides being a mounting side attached to the computing tray near the latch; and a movable bracket having two movable sides attached respectively to the two fixed sides, the movable bracket being adjustable relative to the fixed bracket between a releasing position and a secured position, the movable bracket allowing the latch to release the computing tray in the releasing position, the movable bracket physically blocking the latch from releasing the computing tray in the secured position;

wherein a pin protrudes from the one of the fixed sides; and wherein the one of the fixed sides includes at least one through hole configured to receive a second fastener such that the fixed bracket is attached to the computing tray by the second fastener penetrating the at least one through hole and the computing tray.

21. A computing system comprising:

a computing tray for receiving a computing device;

a latch attached to the computing tray for releasing the computing tray during installation or removal operations; and a lock assembly for preventing accidental release of the computing tray, the lock assembly including a fixed bracket having two fixed sides, one of the fixed sides being a mounting side attached to the computing tray near the latch; and a movable bracket having two movable sides attached respectively to the two fixed sides, the movable bracket being adjustable relative to the fixed bracket between a releasing position and a secured position, the movable bracket allowing the latch to release the computing tray in the releasing position, the movable bracket physically blocking the latch from releasing the computing tray in the secured position;

wherein a pin protrudes from the one of the fixed sides;

wherein a groove is at another one of the movable sides, the groove being configured to engage or disengage with the pin; and wherein:

the groove is not engaged with the pin when the lock assembly is in the releasing position; and the groove is engaged with the pin when the lock assembly is in the secured position.

* * * * *